United States Patent [19]

Fukuda

[11] Patent Number: 4,955,673
[45] Date of Patent: Sep. 11, 1990

[54] ARRANGEMENT OF ELECTRONIC ANTISKID BRAKE SYSTEM

[75] Inventor: Mitsunobu Fukuda, Kawasaki, Japan

[73] Assignee: Nissan Motor Co., Ltd., Yokohama, Japan

[21] Appl. No.: 143,091

[22] Filed: Jan. 12, 1988

[30] Foreign Application Priority Data

Jan. 13, 1987 [JP] Japan .............................. 62-3435[U]

[51] Int. Cl.$^5$ .............................................. B60T 8/32
[52] U.S. Cl. .................................. 303/113; 180/89.1; 296/203; 296/188; 303/1; 303/91
[58] Field of Search ................... 303/1, 56, 91, 113, 303/115; 286/188, 194, 198, 203; 180/89.1; 137/351, 354

[56] References Cited

U.S. PATENT DOCUMENTS

| | | | |
|---|---|---|---|
| 3,625,301 | 12/1971 | Joyslen | 303/1 X |
| 4,505,354 | 3/1985 | Suzuki et al. | 296/198 |
| 4,542,934 | 9/1985 | Komatsu et al. | 296/194 |
| 4,655,509 | 4/1987 | Ando et al. | 303/115 X |
| 4,723,811 | 2/1988 | Harashi | 296/188 X |
| 4,767,153 | 8/1988 | Kawasaki et al. | 296/183 |

FOREIGN PATENT DOCUMENTS

| | | | |
|---|---|---|---|
| 3315764 | 10/1984 | Fed. Rep. of Germany | 303/1 |
| 0012850 | 1/1983 | Japan | 296/203 |

OTHER PUBLICATIONS

"Toyota Soarer", Toyoda Jidosha Kabushika Kaisha, 1-1986, pp. 91-100.

Primary Examiner—Douglas C. Butler
Attorney, Agent, or Firm—Pennie & Edmonds

[57] ABSTRACT

An arrangement of an electrically controlled antiskid brake system in a motor vehicle. The arrangement comprises a side member which is secured to one of hood ridges of the vehicle and extends along a longitudinal axis of the vehicle; an electric actuator which constitutes part of the antiskid brake system and is mounted on the side member; and a plurality of brake pipes which constitute part of the antiskid brake system and extend from the electric actuator. The brake pipes run along the side member and are connected to the same by clips.

10 Claims, 3 Drawing Sheets

ARRANGEMENT OF ELECTRONIC ANTISKID BRAKE SYSTEM

BACKGROUND OF THE INVENTION

1. Field of the Invention

The present invention relates in general to electronic antiskid brake systems of a wheeled motor vehicle, and more particularly to an arrangement of the electronic antiskid brake system in the vehicle.

2. Description of the Prior Art

Hitherto, electronic antiskid brake systems have been widely applied to the field of wheeled motor vehicles for the reliable function thereof. In such systems, the brake pressure applied from a master cylinder to each wheel brake cylinder is controlled in accordance with the condition of the wheels, in order to suppress the dangerous LOCK phenomenon of the wheels upon braking. Some of the electronic antiskid brake systems hitherto proposed are of a type which includes an electric actuator which functions to control the hydraulic pressure applied from the master cylinder to each wheel brake cylinder. Because of its inherency in arrangement, the electric actuator is usually mounted on a way of a bundle of brake pipes which extend from the master cylinder to the wheel brake cylinders.

As is shown in FIG. 4, some of the electronic antiskid brake systems have the electric actuator (which is designated by numeral 1) placed within an engine room for facilitating the installation and adjustment of the same. Designated by numeral 3 is a dash panel. As is seen from the drawing, in such case, the electric actuator 1 is placed in a space defined behind a rigidly constructed strut tower 2 in order to protect itself from damaging upon a vehicle collision or the like.

However, as is shown in FIG. 5, when the space behind the strut tower 2 is not large enough for placing therein the electric actuator 1, it has become necessary to locate the actuator 1 in another place, such as a place in front of the strut tower 2 and near a hood ridge or hood side panel 4. However, as is easily understood, such place is not suitable for protecting the actuator 1 upon a vehicle collision, particularly when the vehicle is struck from the side. As is known, leakage of brake liquid during running of the vehicle brings about a quite dangerous matter.

SUMMARY OF THE INVENTION

It is therefore an object of the present invention to provide an improved arrangement of an electronic antiskid brake system in a wheeled motor vehicle, which assuredly protects the electric actuator and brake pipes connected thereto even when the motor vehicle is subjected to a vehicle collision or the like.

According to the present invention, there is provided an improved arrangement of an electronic antiskid brake system wherein the electric actuator and the brake pipes associated therewith are placed in a safety position of the engine room.

According to the present invention, there is provided an improved arrangement of the antiskid brake system in a motor vehicle which has an engine room, hood ridges between which the engine room is defined and an electronically controlled antiskid brake system. The arrangement comprises a side member secured to one of the hood ridges and extending along a longitudinal axis of the vehicle; an electric actuator which constitutes part of the antiskid brake system, the actuator being mounted on the side member; and a plurality of brake pipes which constitute part of the antiskid brake system and extend from the electric actuator, the brake pipes running along the side member and secured to the same.

DETAILED DESCRIPTION OF THE INVENTION

Figure 1:
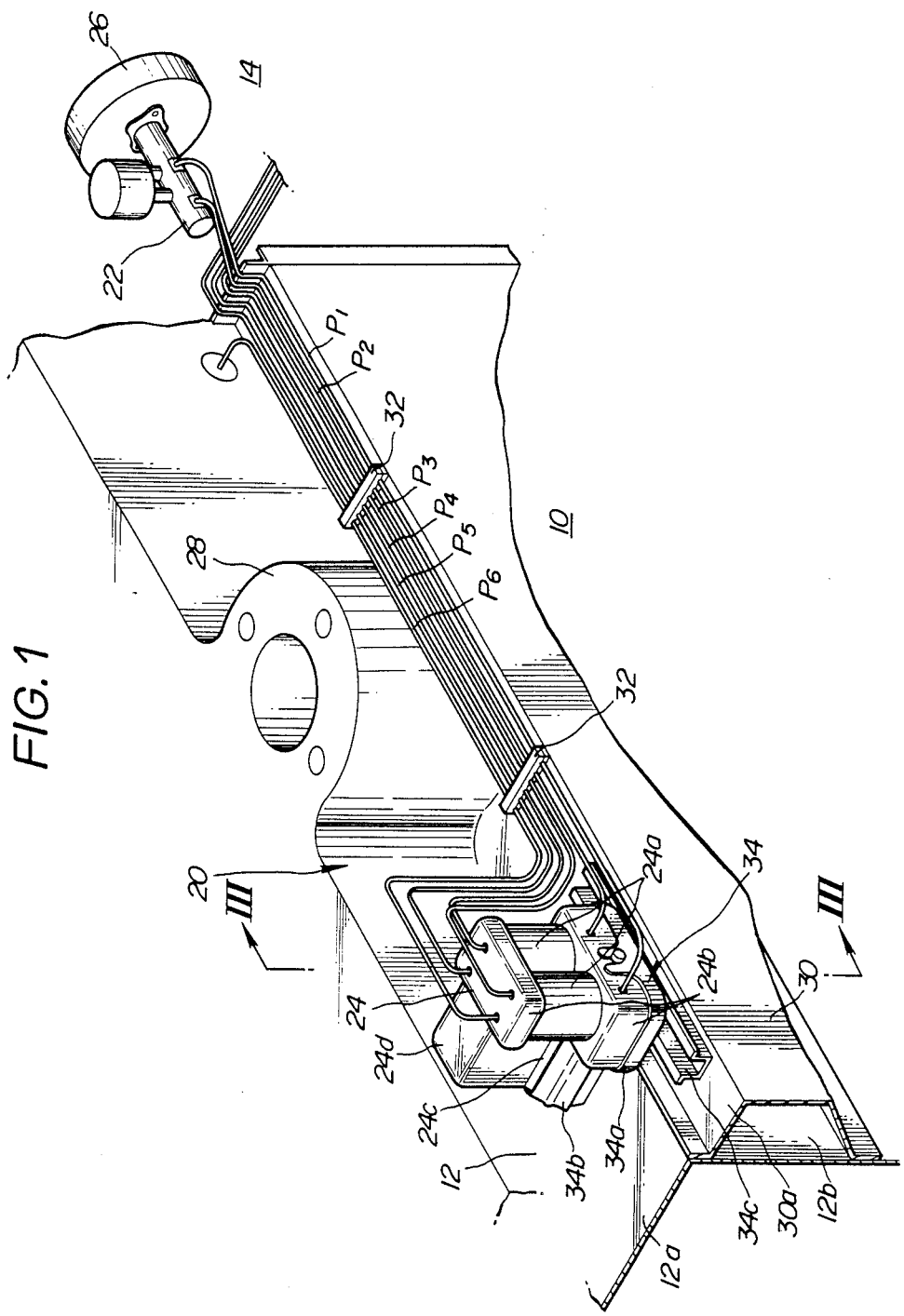
FIG. 1 is a perspective view of an essential part of an antiskid brake system which is arranged in accordance with the present invention.
Figure 2:
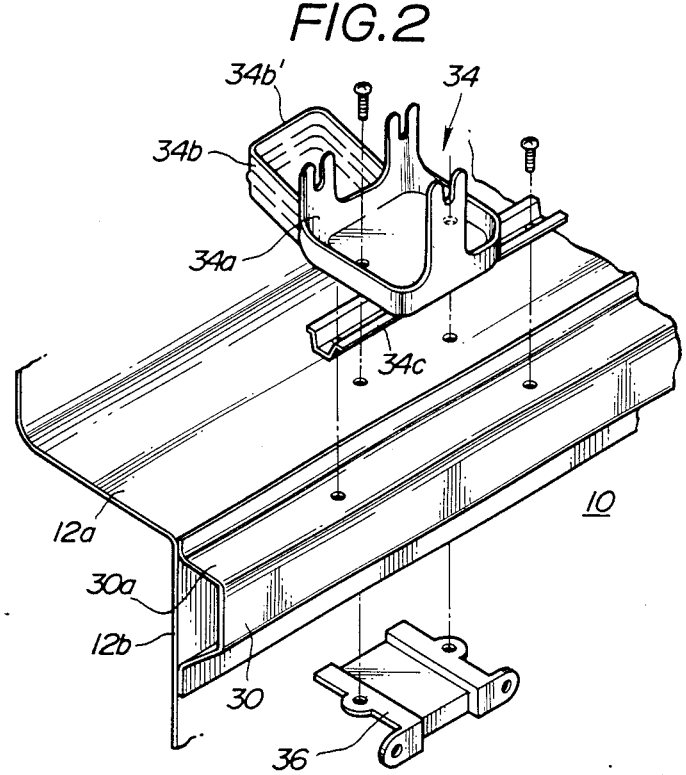
FIG. 2 is an exploded view of a mounting device for mounting an electric actuator to a given portion.
Figure 3:
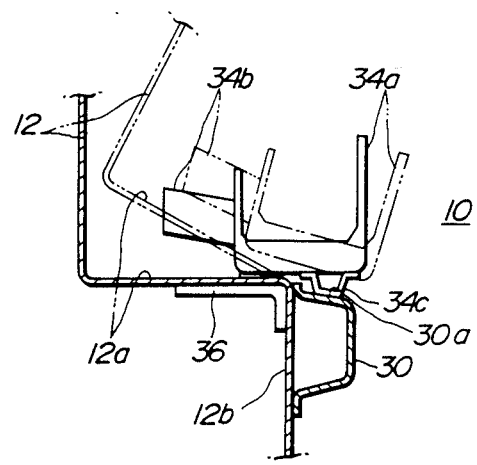
FIG. 3 is a sectional view taken along the line III—III of FIG. 1.
Figure 4:
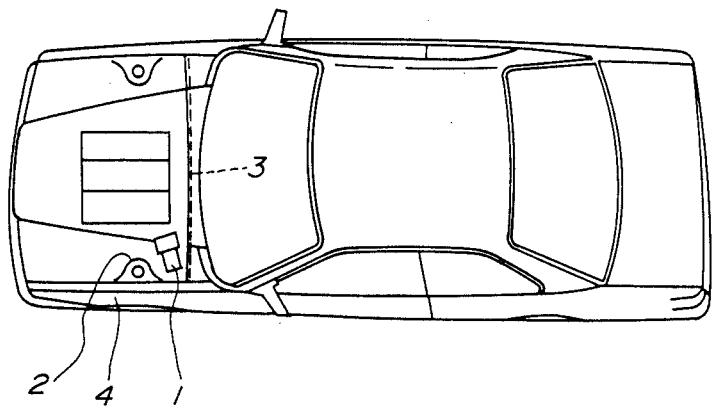
FIGS. 4 and 5 are sketches of a wheeled motor vehicle having a conventional arrangement of the electronic antiskid brake system mounted therein, showing the positions where the electric actuator is placed.
Figure 5:
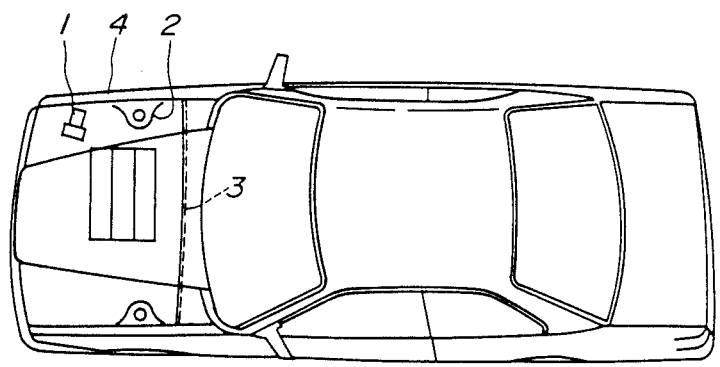

Referring to FIGS. 1 to 3, particularly FIG. 1, there is shown an arrangement of an electronic antiskid brake system in a wheeled motor vehicle, according to the present invention. Designated by numeral 10 is an engine room which has side portions bounded by respective hood ridges 12 (or hood side panels) and has a rear portion bounded by a dash panel 14. Within the engine room 10, there are arranged a master cylinder 22 and an electric actuator 24 which constitute part of an electronic antiskid brake system 20 to which the present invention is practically applied.

Upon depression of a brake pedal (not shown), the master cylinder 22 produces a brake pressure with the aid of a brake booster 26. Two brake pipes $P_1$ and $P_2$ extend from the master cylinder 22 to the electric actuator 24 for transmitting the brake pressure to the actuator 24.

The actuator 24 comprises electromagnetic valves 24a which, in accordance with instruction signals applied thereto from wheel brake condition sensors (not shown), control the hydraulic pressure applied to each wheel brake cylinder. The actuator 24 further comprises a reservoir tank which functions to temporarily store the brake liquid for reducing the brake pressure, an accumulator which functions to store the brake liquid for increasing the brake pressure, a pump which functions to transfer the brake liquid from the reservoir tank to the accumulator, a housing 24b which houses therein the above-mentioned parts and an electric motor 24c which drives the pump. A motor relay 24d is mounted on the motor 24c.

Four brake pipes $P_3$, $P_4$, $P_5$ and $P_6$ extend from the electric actuator 24 to respective brake cylinders of the four road wheels (not shown).

In accordance with the present invention, the electric actuator 24 is mounted on a side member 30 which is welded to an inboard side of the hood ridge 12 as is seen from FIG. 1. Designated by numeral 28 is a strut tower which is integral with the hood ridge 12. The side member 30 has a generally channel-like construction and is secured to the hood ridge 12 having an elongate track portion 30a thereof facing upward and running along the longitudinal axis of the vehicle. The six brake pipes $P_1$, $P_2$, $P_3$, $P_4$, $P_5$ and $P_6$ run in parallel along the elongate track portion 30a. Clamps 32 and 32 are used for fixing the pipes to the track portion 30a.

As is seen from the drawings, the electric actuator 24 is bolted to the track portion 30a of the side member 30 through a mounting device 34 which is constructed of pressed metal.

As is best seen in FIG. 2, the mounting device 34 comprises a basin-like housing holder 34a for receiving therein the housing 24b of the actuator 24, and a basin-like motor holder 34b for receiving therein the motor 24c. These holders 34a and 34b are integrally connected to each other. The housing holder 34a is formed with bolt holes (no numerals) for the reason which will become apparent hereinafter. The side walls 34b' of the motor holder 34b are corrugated for increasing the mechanical strength thereof. Furthermore, the motor holder 34b is so sized that upon receiving therein the motor 24c, is created a considerable clearance between the side walls 34b' and the outer periphery of the motor 24c. This is made for protecting the motor 24c even when the side walls 34b' of the motor holder 34b are somewhat deformed due to a vehicle collision or the like.

The mounting device 34 further comprises a channel-like spacer 34c which is interposed between the elongate track portion 30a of the side member 30 and the housing holder 34a of the mounting device 34. As is seen from FIG. 2, the spacer 34c is formed at its longitudinal ends with bolt holes (no numerals) and has a thickness matching with a gap between the track portion 30a and a horizontal portion 12a of the hood ridge 12.

Upon assembly, a reinforcing plate 36 is used, which has a generally L-shaped cross section and has two threaded bolt holes (no numerals) formed therethrough. That is, as is understood from FIGS. 2 and 3, the spacer 34c is bolted to the track portion 30a of the side member 30, and the housing holder 34a of the mounting device 34 is bolted to the horizontal portion 12a of the hood ridge 12 having an inside part thereof in contact with the upper part of the spacer 34c. Preferably, the spacer 34c is welded to the housing holder 34a. The reinforcing plate 36 is attached to a back surface of the horizontal portion 12a of the hood ridge 12. For this attachment, the bolts from the housing holder 34a of the mounting device 34 are engaged with the threaded holes of the reinforcing plate 36. For assuring the attachment, the reinforcing plate 36 is further bolted to a vertical portion 12b of the hood ridge 12. It is to be noted that upon assembly, the electric actuator 24 is so oriented that the motor 24c is placed outboard with respect to the engine room 10.

As is seen from FIG. 1, each of the brake pipes $P_1$, $P_2$, $P_3$, $P_4$, $P_5$ and $P_6$ is connected to the electric actuator 24 through bent portions thereof.

In the following, advantages of the above-mentioned arrangement of the electronic antiskid brake system of the present invention will be described.

First, because of provision of the channel-like side member 30 which extends along the longitudinal axis of the vehicle, the durability or safety of the position where the electric actuator 24 and the pipes $P_1$, $P_2$, $P_3$, $P_4$, $P_5$ and $P_6$ are arranged is considerably improved and increased against a vehicle head-on collision.

Second, even if the side member 30 is somewhat deformed upon a vehicle head-on collision, the relative displacement between the electric actuator 24 and each brake pipe $P_1$, $P_2$, $P_3$, $P_4$, $P_5$ or $P_6$ is minimized because these parts are mounted on the common part, viz., the side member 30. This matter minimizes not only the possibility of disconnection of the pipes from the actuator 24 but also the possibility of breakage of the pipes. This advantageous phenomenon is also expected when the vehicle is subjected to a side vehicle collision.

Third, even if, due to a side vehicle collision or the like the hood ridge 12 is greatly deformed and thus the electric actuator 24 is turned greatly as is illustrated by the phantom lines in FIG. 3, the relative displacement between the actuator 24 and the brake pipes can be minimized because of the same reason as mentioned hereinabove.

As is understood from the foregoing description, in accordance with the present invention, the electric actuator and the brake pipes associated therewith are placed in a so-called safety position of the engine room. Thus, they are assuredly protected from breakage even when the vehicle is subjected to a vehicle collision or the like.

What is claimed is:

1. In a motor vehicle having an engine room, hood ridges between which said engine room is defined, and an electrically controlled antiskid brake system,
an arrangement comprising:
a side member secured to one of said hood ridges and extending along longitudinal axis of said vehicle;
an electric actuator which constitutes part of said antiskid brake system, said actuator being mounted on said side member;
a plurality of brake pipes which constitute part of said antiskid brake system and extend from said electric actuator, said brake pipes running along said side member and secured to the same;
said side member being a generally channel-like member which has an elongate flat track portion on which said electric actuator and said brake pipes are tightly disposed; and
a mounting device through which said electric actuator is connected to said track portion, said mounting device including a first holder portion which receives a first portion of said actuator and a second holder portion which receives a second portion of said actuator.

2. An arrangement as claimed in claim 1, in which said mounting device further includes a spacer which is disposed between said track portion of the side member and a bottom of said first holder portion.

3. An arrangement as claimed in claim 2, in which said spacer is bolted to said track portion, and in which said first holder portion of said mounting device is bolted to a horizontal flat portion of said hood ridge.

4. An arrangement as claimed in claim 3, further comprising a reinforcing plate which is bolted to a back surface of said hood ridge.

5. An arrangement as claimed in claim 4, in which said brake pipes are connected to said track portion by means of clamps.

6. An arrangement as claimed in claim 5, in which said spacer is of a channel member, said spacer having a thickness which matches with a gap between said horizontal portion of said hood ridge and said track portion of side member.

7. An arrangement as claimed in claim 6, in which said second holder portion of said mounting device is so sized as to define a considerable clearance between the side wall of said second holder portion and the outer periphery of said second portion of said actuator.

8. An arrangement as claimed in claim 7, in which said mounting device is so oriented that said second holder device is positioned on a hood ridge between the engine room and the exterior of the motor vehicle.

9. In a motor vehicle having an engine room, hood ridges between which said engine room is defined, and an electronically controlled antiskid brake system, an arrangement comprising:
- a generally channel-like side member including an elongate flat track portion secured to one of said hood ridges and extending along a longitudinal axis of said vehicle;
- an electric actuator which constitutes part of said antiskid brake system;
- a mounting device through which said electric actuator is connected to said flat track portion of said side member, said mounting device including a first holder portion which receives a first portion of said actuator and a second holder portion which receives a second portion of said actuator;
- said second holder portion of said mounting device is so sized so as to loosely receive said second portion of said actuator within its outer periphery; and
- a plurality of brake pipes which constitute part of said antiskid brake system and extend from said electric actuator, said brake pipes running along said flat track portion of said side member and secured to the same.

10. An arrangement as claimed in claim 9, in which said mounting device is so oriented that said second holder device is positioned on a hood ridge between the engine room and the exterior of the motor vehicle.

* * * * *